(12) United States Patent
Amano et al.

(10) Patent No.: US 8,091,668 B2
(45) Date of Patent: Jan. 10, 2012

(54) MOTOR VEHICLE AND CONTROL METHOD OF MOTOR VEHICLE

(75) Inventors: Takashi Amano, Susono (JP); Takeshi Kotani, Nisshin (JP)

(73) Assignee: Toyoda Jidosha Kabushiki Kaisha, Toyota-Shi (JP)

( * ) Notice: Subject to any disclaimer, the term of this patent is extended or adjusted under 35 U.S.C. 154(b) by 147 days.

(21) Appl. No.: 12/613,603

(22) Filed: Nov. 6, 2009

(65) Prior Publication Data

US 2010/0147611 A1 Jun. 17, 2010

(30) Foreign Application Priority Data

Nov. 6, 2008 (JP) .................................. 2008-285577

(51) Int. Cl.
*B60K 11/08* (2006.01)
(52) U.S. Cl. ..................................... 180/68.1; 123/41.05
(58) Field of Classification Search .................. 180/68.1, 180/68.2, 68.3, 68.4, 68.6; 123/41.02, 41.04, 123/41.05
See application file for complete search history.

(56) References Cited

U.S. PATENT DOCUMENTS

| 4,753,468 | A | * | 6/1988 | Szymczak et al. | ............ | 293/132 |
| 6,854,544 | B2 | * | 2/2005 | Vide | ............ | 180/68.6 |
| 7,766,111 | B2 | * | 8/2010 | Guilfoyle et al. | ............ | 180/68.1 |

FOREIGN PATENT DOCUMENTS

| JP | 58025226 A | 2/1983 |
| JP | 58124017 A | 7/1983 |
| JP | 59070226 A | 4/1984 |
| JP | S60-100220 | 7/1985 |
| JP | S61-174332 | 10/1986 |
| JP | 1016422 A | 1/1989 |
| JP | H04-163230 | 6/1992 |
| JP | 08260969 A | 10/1996 |
| JP | 2000130167 A | 5/2000 |
| JP | 2006056426 A | 3/2006 |
| JP | 2007022297 A | 2/2007 |
| JP | 2007320527 A | 12/2007 |

OTHER PUBLICATIONS

Japanese Office Action dated Jul. 29, 2010; 6 pages.

* cited by examiner

*Primary Examiner* — John Walters
(74) *Attorney, Agent, or Firm* — Gifford, Krass, Sprinkle, Anderson & Citkowski, P.C.

(57) ABSTRACT

A motor vehicle is equipped with an outside air introduction assembly 104 functioning to introduce the outside air into a radiator 92 in an engine cooling system during driving, as well as with an outside air introduction assembly 114 functioning to introduce the outside air into an engine 22 during driving. The motor vehicle is also equipped with shutter plates 106 capable of regulating the amount of the outside air to be introduced by the outside air introduction assembly 104, as well as with shutter plates 116 capable of regulating the amount of the outside air to be introduced by the outside air introduction assembly 114. The shutter plates 106 and the shutter plates 116 are individually actuated and controlled to increase the amount of the outside air to be introduced by the outside air introduction assembly 104 and the amount of the outside air to be introduced by the outside air introduction assembly 114 with an increase of temperature of cooling water detected as a cooling water temperature Twe in the engine cooling system. Such actuation and control assures the adequate cooling performances to cool down the cooling water by the radiator 92 and to cool down the engine 22.

9 Claims, 7 Drawing Sheets ced in the heat exchanger by the
first outside air introduction assembly; and a second adjustment assembly arranged to regulate an amount of the outside air to be introduced into the internal combustion engine by the second outside air introduction assembly.

MOTOR VEHICLE AND CONTROL METHOD OF MOTOR VEHICLE

BACKGROUND OF THE INVENTION

1. Technical Field

The present invention relates to a motor vehicle and a control method of the motor vehicle. More specifically the invention pertains to a motor vehicle equipped with an internal combustion engine held in a storage space provided in a vehicle front portion, as well as to a control method of such a motor vehicle.

2. Related Art

One typically proposed structure of a motor vehicle includes a radiator provided on a front end of an engine room, a first radiator grill provided above a front bumper to be opposed to an upper portion on a front face of the radiator in a longitudinal direction of the vehicle, a second radiator grill provided in the front bumper to be opposed to a lower portion on the front face of the radiator in the longitudinal direction of the vehicle, shutter plates provided to adjust the opening area of the first radiator grill, and baffle plates provided to regulate the direction of the outside air introduced by the second radiator grill to an upward direction or a downward direction on the front face of the radiator (see, for example, Japanese Patent Laid-Open No. 2007-320527). The motor vehicle of this prior art structure actuates the shutter plates and the baffle plates based on a water temperature in the radiator to reduce the resistance of the air during driving and to prevent a decrease in cooling performance of the radiator.

SUMMARY OF THE INVENTION

In a conventional structure of the motor vehicle, an engine is located on the rear side of the radiator in the engine room. In a state where the cooling water has a low temperature and circulation of the cooling water to the radiator stops, a temperature rise of the engine may undesirably facilitate deterioration of resin components, such as cable, clips, and casings, located in the periphery of the engine. It is thus desired to cool down the engine, separately from the performance of cooling down the engine by the cooling water. It is also desired to cool down the cooling water in the radiator.

In the motor vehicle and the control method of the motor vehicle, there would be a requirement for assuring adequate cooling performances to cool down an internal combustion engine held in a storage space and to cool down a cooling liquid by a heat exchanger provided in the storage space.

The present invention accomplishes at least part of the requirement mentioned above and the other relevant requirements by variety of configurations and arrangements applied to the motor vehicle and the control method of the motor vehicle.

According to one aspect, the invention is directed to a motor vehicle equipped with an internal combustion engine held in a storage space provided in a vehicle front portion. The motor vehicle has: a heat exchanger provided in proximity to a forefront of the storage space and arranged to perform heat exchange between a cooling liquid used for cooling down the internal combustion engine and the outside air; a first outside air introduction assembly arranged to introduce the outside air from the forefront of the storage space into the heat exchanger during driving of the motor vehicle; a second outside air introduction assembly arranged to introduce the outside air from the forefront of the storage space into the internal combustion engine during driving of the motor vehicle; a first adjustment assembly arranged to regulate an amount of the outside air to be introduced into the heat exchanger by the first outside air introduction assembly; and a second adjustment assembly arranged to regulate an amount of the outside air to be introduced into the internal combustion engine by the second outside air introduction assembly.

The motor vehicle of the present invention holds the internal combustion engine in the storage space provided in the vehicle front portion and includes the heat exchanger provided in proximity to the forefront of the storage space and arranged to perform heat exchange between the cooling liquid used for cooling down the internal combustion engine and the outside air; the first outside air introduction assembly arranged to introduce the outside air from the forefront of the storage space into the heat exchanger during driving of the motor vehicle; the second outside air introduction assembly arranged to introduce the outside air from the forefront of the storage space into the internal combustion engine during driving of the motor vehicle; the first adjustment assembly arranged to regulate the amount of the outside air to be introduced into the heat exchanger by the first outside air introduction assembly; and the second adjustment assembly arranged to regulate the amount of the outside air to be introduced into the internal combustion engine by the second outside air introduction assembly. This arrangement assures the adequate cooling performances to cool down the internal combustion engine held in the storage space and to cool down the cooling liquid by the heat exchanger provided in the storage space.

In one embodiment of the invention, the motor vehicle of the above aspect further includes: an engine cooling liquid temperature detection unit designed to detect temperature of the cooling liquid in the internal combustion engine as an engine cooling liquid temperature; an engine reflecting temperature detection unit designed to detect a specific temperature reflecting temperature of the internal combustion engine as an engine reflecting temperature; and a controller configured to control the first adjustment assembly to increase the amount of the outside air to be introduced into the heat exchanger with an increase of the detected engine cooling liquid temperature. The controller may control the second adjustment assembly to increase the amount of the outside air to be introduced into the internal combustion engine with an increase of the detected engine reflecting temperature. This arrangement assures the more adequate cooling performances to cool down the internal combustion engine and to cool down the cooling liquid by the heat exchanger. In one application of the motor vehicle according to this embodiment of the invention, on the condition of no supply of the cooling liquid to the heat exchanger, the controller controls the first adjustment assembly to prohibit introduction of the outside air into the heat exchanger. This arrangement assures the more adequate cooling performance to cool down the cooling liquid by the heat exchanger.

In one application of the motor vehicle according to the above aspect of the invention, the first adjustment assembly adjusts an area for introduction of the outside air in the first outside air introduction assembly, so as to regulate the amount of the outside air to be introduced into the heat exchanger, and the second adjustment assembly adjusts an area for introduction of the outside air in the second outside air introduction assembly, so as to regulate the amount of the outside air to be introduced into the internal combustion engine. In one embodiment of the invention, the motor vehicle of this application may further include: a vehicle speed measurement unit designed to measure a vehicle speed; and a controller configured to control the first adjustment assembly and the second adjustment assembly to decrease the area for introduction of the outside air in the first outside air introduction assembly and the area for introduction of the outside air in the second outside air introduction assembly with an increase of the measured vehicle speed. The motor vehicle may be constructed to decrease the resistance of the air against the vehicle during driving with a decrease of the area for introduction of the outside air by the first outside air introduction assembly and with a decrease of the area for introduction of the outside air by the second outside air introduction assembly. The arrangement of the embodiment is preferably adopted in this motor vehicle to assure the more adequate cooling performances to cool down the internal combustion engine and to cool down the cooling liquid by the heat exchanger, as well as the effective reduction of the resistance of the air against the vehicle during driving.

In another application of the motor vehicle according to the above aspect of the invention, the internal combustion engine has an exhaust system provided on a front side of the internal combustion engine along a longitudinal axis of the motor vehicle. This structure enables the exhaust system of the internal combustion engine to be readily cooled down by introduction of the outside air into the internal combustion engine.

In another embodiment of the invention, the motor vehicle of the above aspect further includes: a partition member arranged to separate the outside air taken in from the forefront of the storage space by the first outside air introduction assembly from the outside air taken in from the forefront of the storage space by the second outside air introduction assembly as the outside air to be introduced into the heat exchanger and as the outside air to be introduced into the internal combustion engine. This arrangement assures the effective introduction of the outside air into the heat exchanger and the effective introduction of the outside air into the internal combustion engine.

In still another application of the motor vehicle according to the above aspect of the invention, the heat exchanger is attached to the storage space in such a manner that a lower end of the heat exchanger is positioned above a lower end of the internal combustion engine along a vertical axis of the motor vehicle, and the second outside air introduction assembly takes in the outside air and causes the taken outside air to pass through a space below the heat exchanger and to be introduced into the internal combustion engine. This arrangement assures the effective introduction of the outside air into the internal combustion engine.

In still another embodiment of the invention, the motor vehicle of the above aspect further includes: a motor driving system provided in proximity to the internal combustion engine in the storage space and constructed to include: a motor designed to receive a supply of electric power from an accumulator and generate a driving power of the motor vehicle; and a driving circuit arranged to drive the motor; and a motor driving system heat exchanger provided in proximity to the heat exchanger in the storage space and arranged to perform heat exchange between the cooling liquid used for cooling down the motor driving system and the outside air. The first outside air introduction assembly introduces the outside air into the heat exchanger and into the motor driving system heat exchanger, and the second outside air introduction assembly introduces the outside air into the internal combustion engine and into the motor driving system. The first adjustment assembly regulates an amount of the outside air to be introduced into the heat exchanger and into the motor driving system heat exchanger, and the second adjustment assembly regulates an amount of the outside air to be introduced into the internal combustion engine and into the motor driving system. This arrangement enables the heat exchanger and the motor driving system heat exchanger provided in the storage space to cool down the cooling liquid, while enabling the internal combustion engine and the motor driving system to be cooled down. In another embodiment of the invention, the motor vehicle of the above aspect further includes: an engine cooling liquid temperature detection unit designed to detect temperature of the cooling liquid in the internal combustion engine as an engine cooling liquid temperature; a motor driving system cooling liquid temperature detection unit designed to detect temperature of the cooling liquid in the motor driving system as a motor driving system cooling liquid temperature; an engine reflecting temperature detection unit designed to detect a specific temperature reflecting temperature of the internal combustion engine as an engine reflecting temperature; a motor driving system reflecting temperature detection unit designed to detect a specific temperature reflecting temperature of the motor driving system as a motor driving system reflecting temperature; and a controller configured to control the first adjustment assembly to set the greater between the amount of the outside air to be introduced into the heat exchanger and the amount of the outside air to be introduced into the motor driving system heat exchanger to a target amount of the outside air to be introduced by the first outside air introduction assembly, where the amount of the outside air to be introduced into the heat exchanger tends to increase with an increase of the detected engine cooling liquid temperature, and the amount of the outside air to be introduced into the motor driving system heat exchanger tends to increase with an increase of the detected motor driving system cooling liquid temperature. The controller may control the second adjustment assembly to set the greater between the amount of the outside air to be introduced into the internal combustion engine and the amount of the outside air to be introduced into the motor driving system to a target amount of the outside air to be introduced by the second outside air introduction assembly, where the amount of the outside air to be introduced into the internal combustion engine tends to increase with an increase of the detected engine reflecting temperature, and the mount of the outside air to be introduced into the motor driving system tends to increase with an increase of the detected motor driving system reflecting temperature. This arrangement assures the adequate cooling performances to cool down the cooling liquid by the heat exchanger and by the motor driving system heat exchanger and to cool down the internal combustion engine and the motor driving system.

According to another aspect, the invention is directed to a control method of a motor vehicle. The motor vehicle includes: an internal combustion engine held in a storage space provided in a vehicle front portion; a heat exchanger provided in proximity to a forefront of the storage space and arranged to perform heat exchange between a cooling liquid used for cooling down the internal combustion engine and the outside air; a first outside air introduction assembly arranged to introduce the outside air from the forefront of the storage space into the heat exchanger during driving of the motor vehicle; a second outside air introduction assembly arranged to introduce the outside air from the forefront of the storage space into the internal combustion engine during driving of the motor vehicle; a first adjustment assembly arranged to regulate an amount of the outside air to be introduced into the heat exchanger by the first outside air introduction assembly; and a second adjustment assembly arranged to regulate an amount of the outside air to be introduced into the internal combustion engine by the second outside air introduction assembly. The control method controls the first adjustment assembly to increase the amount of the outside air to be introduced into the heat exchanger with an increase of temperature of the cooling liquid in the internal combustion engine detected as an engine cooling liquid temperature, and the control method controls the second adjustment assembly to increase the amount of the outside air to be introduced into the internal combustion engine with an increase of a specific temperature reflecting temperature of the internal combustion engine detected as an engine reflecting temperature.

The control method of the motor vehicle controls the first adjustment assembly to increase the amount of the outside air to be introduced into the heat exchanger with an increase of temperature of the cooling liquid in the internal combustion engine detected as an engine cooling liquid temperature, and controls the second adjustment assembly to increase the amount of the outside air to be introduced into the internal combustion engine with an increase of a specific temperature reflecting temperature of the internal combustion engine detected as an engine reflecting temperature. This arrangement assures the adequate cooling performances to cool down the internal combustion engine held in the storage space and to cool down the cooling liquid by the heat exchanger provided in the storage space.

DESCRIPTION OF THE PREFERRED EMBODIMENTS

Some modes of carrying out the invention are described below as preferred embodiments with reference to the accompanied drawings.

Figure 1:
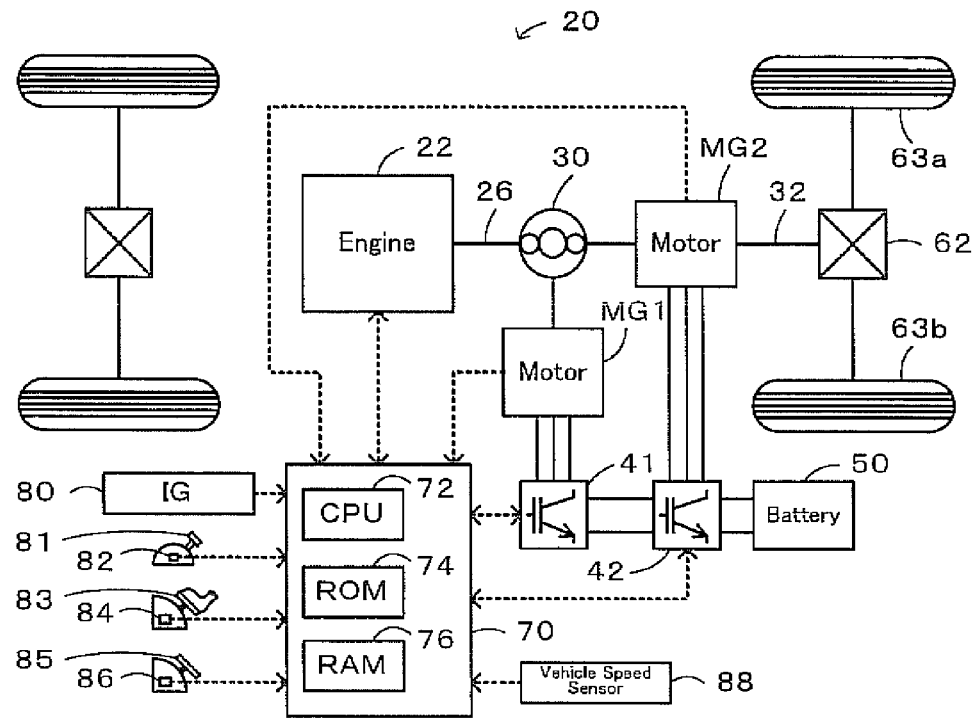
FIG. 1 is an explanatory view illustrating the schematic configuration of a hybrid vehicle in accordance with one embodiment of the invention.
Figure 2:
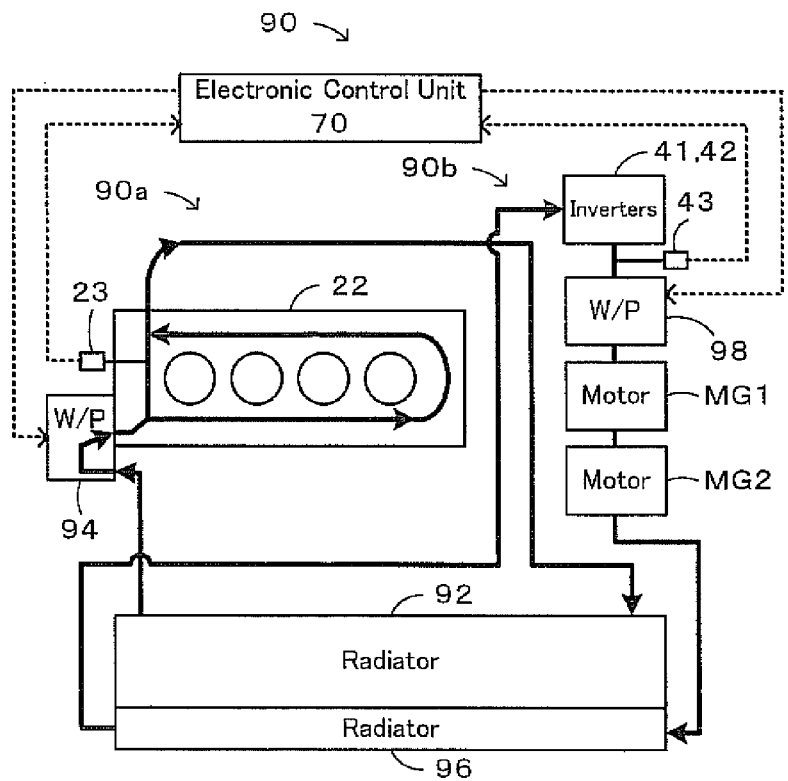
FIG. 2 is an explanatory view showing the schematic structure of a cooling system included in the hybrid vehicle of the embodiment.

FIG. 1 is an explanatory view illustrating the schematic configuration of a hybrid vehicle 20 in accordance with one embodiment of the invention. As illustrated, the hybrid vehicle 20 of the embodiment includes an engine 22 or an internal combustion engine constructed to consume a hydrocarbon fuel, such as gasoline or light oil, and output power, and a planetary gear mechanism 30 constructed to have a carrier connected via a damper with a crankshaft 26 or an output shaft of the engine 22. The hybrid vehicle 20 also includes a motor MG1 structured as a synchronous generator motor to have a rotor connected to a sun gear of the planetary gear mechanism 30, and a motor MG2 structured as a synchronous generator motor to be connected with a ring gear of the planetary gear mechanism 30 and to have a rotor connected to a drive shaft 32 coupled with drive wheels 63a and 63b via a differential gear 62. The hybrid vehicle 20 further includes inverters 41 and 42 respectively arranged to actuate the motors MG1 and MG2, a battery 50 constructed to transmit electric power to and from the motors MG1 and MG2 via the inverters 41 and 42, and an electronic control unit 70 configured to control the operations of the whole hybrid vehicle 20. The hybrid vehicle 20 also has an auxiliary battery (not shown) constructed to receive a supply of electric power from the battery 50, and a cooling system 90 configured to cool down the engine 22, the inverters 41 and 42, and the motors MG1 and MG2 as shown in FIG. 2.

As illustrated, the cooling system 90 includes a cooling system 90a configured to cool down the engine 22 (hereafter referred to as engine cooling system) and a cooling system 90b configured separately from the cooling system 90a to cool down the inverters 41 and 42 and the motors MG1 and MG2 (hereafter referred to as motor cooling system). The engine cooling system 90a has a radiator 92 constructed to mainly utilize the wind by driving to cool down the cooling water circuited as an antifreeze fluid through the engine 22, and a power-driven water pump 94 driven with electric power supplied from the auxiliary battery (not shown) to suck in the cooling water from the radiator 92 as well as the cooling water circulated through the engine 22 from a bypass flow path (not shown) and to pump the sucked cooling water into the engine 22. The cooling water is circulated by actuation of the water pump 94 to cool down the engine 22. The motor cooling system 90b has a radiator 96 constructed to mainly utilize the wind by driving to cool down the cooling water circulated as an antifreeze fluid through the motors MG1 and MG2, and a power-driven water pump 98 driven with electric power supplied from the auxiliary battery (not shown) to suck in the cooling water used for cooling down the inverters 41 and 42 and to pump the sucked cooling water into the motors MG1 and MG2. The cooling water is circulated by actuation of the water pump 98 to cool down the inverters 41 and 42 and the motors MG1 and MG2. In the illustrated structure of the embodiment, the water pump 94 is controlled to stop operation at a cooling water temperature Twe of not higher than a preset first water temperature Twe1 and to start operation at the cooling water temperature Twe of higher than the first water temperature Twe1. The cooling water temperature Twe is obtained from a water temperature sensor 23 arranged to measure the temperature of the cooling water in the engine cooling system 90a. The first water temperature Twe1 represents a specific state where the engine 22 has been warmed up to some extent but the warm-up of the engine 22 has not yet been completed and may be, for example, 50° C. or 60° C. The water pump 98 is, on the other hand, controlled to be always kept on. In the embodiment, the radiator 92 is mounted on the radiator 96.

Figure 3:
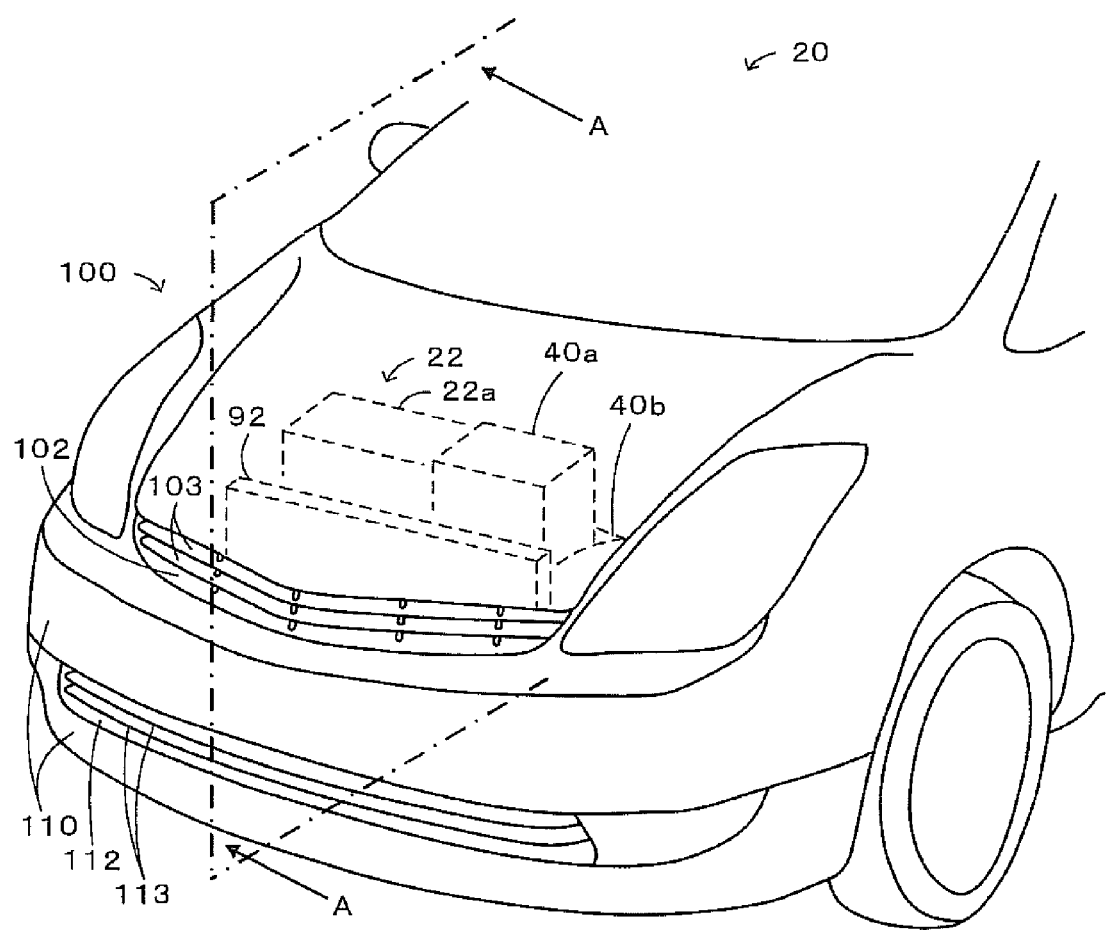
FIG. 3 is an exemplary illustration of a vehicle front portion, including a vehicle front face, of the hybrid vehicle of the embodiment with in-vehicle equipment installed in an engine room, seen from a left front side of the vehicle.

FIG. 3 is an exemplary illustration of a vehicle front portion, including a vehicle front face, of the hybrid vehicle 20 of the embodiment with in-vehicle equipment installed in an engine room 100, seen from a left front side of the vehicle. In the description hereof, the front, the rear, the left, the right, the up, and the down directions of the vehicle are defined relative to a vehicle forwarding direction. As illustrated, the engine 22 is fastened in the engine room 100. The engine 22 has a cylinder head (not shown) with a cylinder head cover 22a mounted thereon and a cylinder block (not shown) located below the cylinder head. The inverters 41 and 42 held in a single casing 40a (hereafter may be simply referred to as the 'inverters 41 and 42' with omission of 'held in the single casing 40a') are located in an upper area on a left side of the engine 22. The motors MG1 and MG2 held in a single casing 40b (hereafter may be simply referred to as the 'motors MG1 and MG2' with omission of 'held in the single casing 40b') are located in a lower area on the left side of the engine 22, that is, below the casing 40a. The radiator 92 is provided in proximity to a forefront of the engine room 100 on the front side of the engine 22 and the inverters 41 and 42. An aperture 102 is formed on the vehicle front face. The aperture 102 is located on the front side of the radiator 92 to allow for introduction of the outside air into the radiators 92 and 96 during drive of the hybrid vehicle 20. Multiple baffle plates 103 are provided in the aperture 102 at a predetermined angle relative to the vehicle forwarding direction. Another aperture 112 is formed in a front bumper 110 on the vehicle front face. The aperture 112 is located below the aperture 102 to allow for introduction of the outside air during drive of the hybrid vehicle 20. Multiple baffle plates 113 are provided in the aperture 112 in a substantially horizontal orientation relative to the vehicle forwarding direction.

Figure 4:
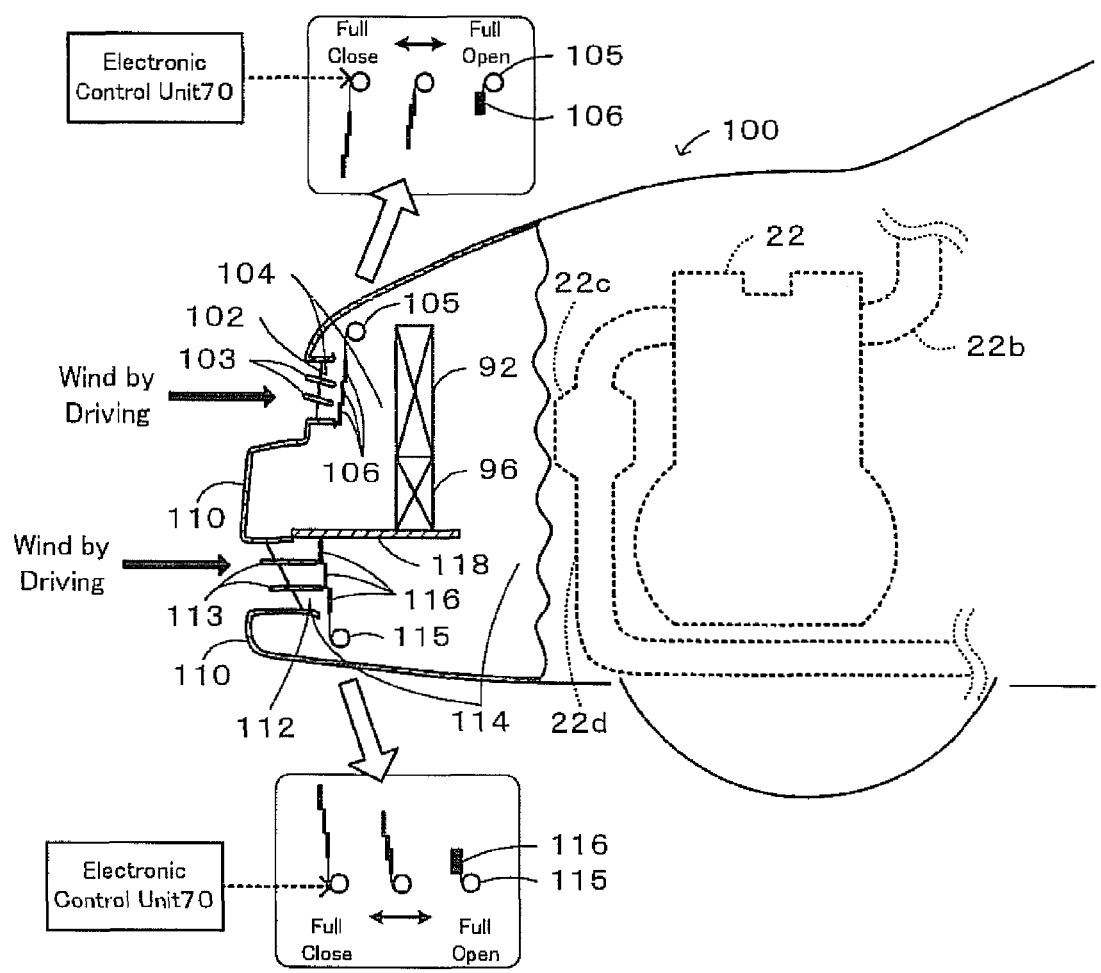
FIG. 4 is an A-A sectional view showing a radiator and apertures, taken on a line A-A in FIG. 3.

FIG. 4 is an A-A sectional view showing the radiator 92 and the apertures 102 and 112, taken on a line A-A in FIG. 3. The inverters 41 and 42 and the motors MG1 and MG2 located in a rear portion of the engine room 100 are omitted from the illustration, and only the engine 22 is shown by the dotted line. As illustrated, an air intake pipe 22b is provided on the rear side of the engine 22 to supply the intake air to the engine 22. An exhaust pipe 22d with a catalytic converter (three-way catalyst) 22c is provided on the front side of the engine 22 to discharge the emission from the engine 22 outside the hybrid vehicle 20. The radiators 92 and 96, the engine 22, and the motors MG1 and MG2 are respectively fastened to the vehicle body by means of fixation members (not shown), such that a lower end of the radiator 96 is positioned above a lower end of the engine 22 as well as a lower end of the casing 40b with the motors MG1 and MG2 held therein. The outside air taken in via the aperture 112 accordingly passes through the lower side of the radiators 92 and 96 and is introduced into the engine 22 including the exhaust pipe 22d, into the inverters 41 and 42, and into the motors MG1 and MG2. A space provided on the front side of the radiators 92 and 96 in the engine room 100 has the function of introducing the outside air into the radiators 92 and 96. This space, in combination with the aperture 102, is thus referred to as an outside air introduction assembly 104. A space provided on the rear side of the aperture 112 in the engine room 100 including a space provided below the radiator 96 has the function of introducing the outside air into the engine 22, the inverters 41 and 42, and the motors MG1 and MG2. This space, in combination with the aperture 112, is thus referred to as an outside air introduction assembly 114. A plate-like partition member 118 is attached to an upper end of the aperture 112 and to a lower end of the radiator 96. The partition member 118 is extended in a vehicle width direction to separate the outside air introduced into the engine room 100 by the outside air introduction assembly 104 from the outside air introduced into the engine room 100 by the outside air introduction assembly 114 during driving of the hybrid vehicle 20. Multiple shutter plates 106 are provided on the rear side of the aperture 102 to be extended in the vehicle width direction. The multiple shutter plates 106 are driven by a motor 105 with electric power supplied from the auxiliary battery (not shown) to freely adjust the opening area of the aperture 102. In a full-open state of the aperture 102, the multiple shutter plates 106 are slid upward along rails (not shown) to be kept at a retreat position in the vicinity of the motor 105. Similarly, multiple shutter plates 116 are provided on the rear side of the aperture 112 to be extended in the vehicle width direction. The multiple shutter plates 116 are driven by a motor 115 with electric power supplied from the auxiliary battery (not shown) to freely adjust the opening area of the aperture 112. In a full-open state of the aperture 112, the multiple shutter plates 116 are slid downward along rail (not shown) to be kept at a retreat position in the vicinity of the motor 115. The hybrid vehicle 20 of the embodiment has the vehicle body sterically designed to have a less resistance of the air against the vehicle during driving with a smaller opening area of the aperture 102 and a smaller opening area of the aperture 112.

The electronic control unit 70 is constructed as a microprocessor including a CPU 72, a ROM 74 designed to store processing programs, a RAM 76 designed to temporarily store data, and input and output ports (not shown). The electronic control unit 70 receives, via the input port, an ignition signal from an ignition switch 80, a gearshift position SP from a gearshift position sensor 82 as a current set position of a gearshift lever 81, an accelerator opening degree Acc from an accelerator pedal position sensor 84 as the driver's depression amount of an accelerator pedal 83, a brake pedal position BP from a brake pedal position sensor 86 as the driver's depression amount of a brake pedal 85, and a vehicle speed V from a vehicle speed sensor 88. The electronic control unit 70 also receives, via the input port, signals from various sensors used to detect and measure the operating conditions of the engine 22, for example, a crank position sensor (not shown) attached to the crankshaft 26. The electronic control unit 70 further receives, via the input port, signals representing the rotational positions of the rotors in the motors MG1 and MG2 from rotational position detection sensors (not shown), and signals required to actuate and control the motors MG1 and MG2, such as phase currents detected by current sensors (not shown) as amounts of electric currents to be applied to the motors MG1 and MG2. The electronic control unit 70 also receives, via the input port, signals required for management of the battery 50, such as a charge-discharge current from a current sensor (not shown) provided in proximity to an output terminal of the battery 50, a cooling water temperature Twe from a water temperature sensor 23 detected as the temperature of the cooling water circulated in the engine cooling system 90a, and a cooling water temperature Twm from a water temperature sensor 43 detected as the temperature of the cooling water circulated in the motor cooling system 90b. The electronic control unit 70 outputs, via the output port, signals used to control the operations of the engine 22, switching control signals to the inverters 41 and 42, driving signal to the power-driven water pumps 94 and 98 in the cooling system 90, and driving signals to the motors 105 and 115 actuated to drive the shutter plates 106 and 116.

The hybrid vehicle 20 of the embodiment having the construction discussed above calculates a torque demand to be output to the drive shaft 32 from the measured vehicle speed V and the detected accelerator opening degree Acc corresponding to the driver's depression amount of the accelerator pedal 83. The hybrid vehicle 20 then controls the operations of the engine 22 and the motors MG1 and MG2 to ensure output of a required power corresponding to the calculated torque demand to the drive shaft 32.

Figure 5:
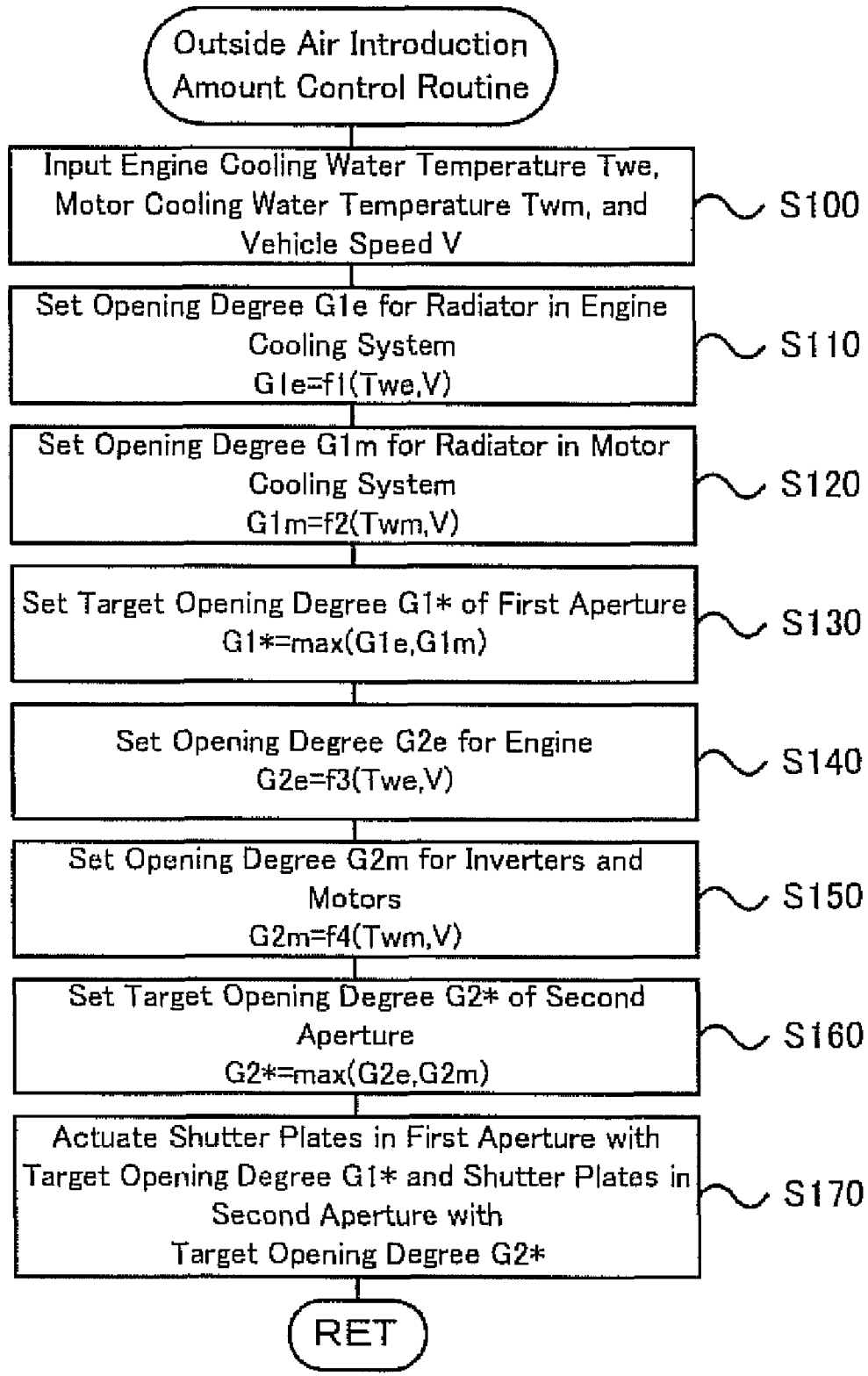
FIG. 5 is a flowchart showing an outside air introduction amount control routine executed by an electronic control unit mounted on the hybrid vehicle of the embodiment.

The following describes the operations of the hybrid vehicle 20 of the embodiment, specifically a series of operations performed to regulate the amounts of the outside air to be introduced into the engine room 100 during driving. FIG. 5 is a flowchart showing an outside air introduction amount control routine executed by the electronic control unit 70. This routine is performed repeatedly at preset time intervals (for example, at every several hundred milliseconds or at every several seconds).

On start of the outside air introduction control routine, the CPU 72 of the electronic control unit 70 first inputs various data required for control, for example, the cooling water temperature Twe in the engine cooling system 90a from the water temperature sensor 23, the cooling water temperature Twm in the motor cooling system 90b from the water temperature sensor 43, and the vehicle speed V from the vehicle speed sensor 88 (step S100).

Figure 6:
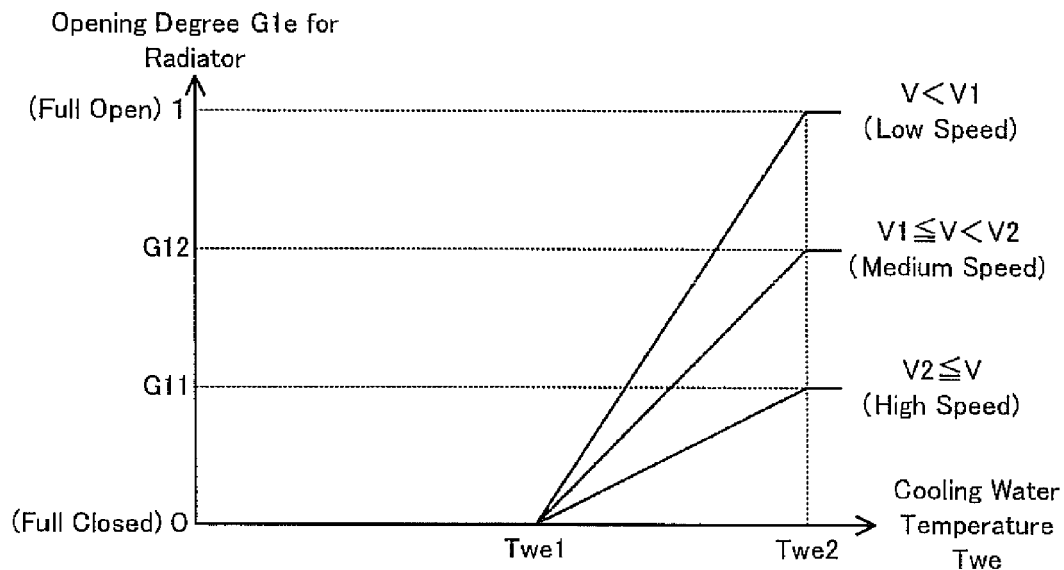
FIG. 6 is an explanatory view showing one example of an engine cooling system radiator opening degree setting map.

After the data input, the CPU 72 sets an opening degree G1e for the radiator 92 required by the radiator 92 of the engine cooling system 90a as the opening degree of the aperture 102 formed in the vehicle front face, based on the input cooling water temperature Twe in the engine cooling system 90a and the input vehicle speed V (step S110). A concrete procedure of setting the opening degree G1e for the radiator 92 in the embodiment specifies and stores relations of the opening degree G1e to the cooling water temperature Twe with regard to various settings of the vehicle speed V as an engine cooling system radiator opening degree setting map in the ROM 74. The procedure reads and sets the opening degree G1e corresponding to a given combination of the cooling water temperature Twe and the vehicle speed V from the stored engine cooling system radiator opening degree setting map. One example of the engine cooling system radiator opening degree setting map is shown in FIG. 6. As shown in FIG. 6, the engine cooling system radiator opening degree setting map is designed, such that the opening degree G1e is equal to 0 (representing a full closed position) at the cooling water temperature Twe of not higher than the preset first water temperature Twe1 explained previously, independently of the vehicle speed V, and gradually increases from 0 with an increase of the cooling water temperature Twe from the first water temperature Twe1. In a high-speed driving state with the vehicle speed V of not lower than a preset vehicle speed V2 (for example, 80 km/hour), the opening degree G1e reaches a first intermediate opening degree G11 (for example, 0.3 or 0.4) greater than 0, when the cooling water temperature Twe becomes equal to or higher than a preset second water temperature Twe2. The second water temperature Twe2 represents a specific state where the warm-up of the engine 22 has been completed and may be, for example, 70° C. or 80° C. In a medium-speed driving state with the vehicle speed V of not lower than a preset vehicle speed V1 (for example, 30 km/hour) but lower than the preset vehicle speed V2, the opening degree G1e reaches a second intermediate opening degree G12 (for example, 0.6 or 0.7) greater than the first intermediate opening degree G11, when the cooling water temperature Twe becomes equal to or higher than the preset second water temperature Twe2. In a low-speed driving state with the vehicle speed V of lower than the preset vehicle speed V1, the opening degree G1e reaches 1 (representing a full open position), when the cooling water temperature Twe becomes equal to or higher than the preset second water temperature Twe2. Under the condition of the cooling water temperature Twe of not higher than the preset first water temperature Twe1, the cooling performance of the radiator 92 to cool down the cooling water is not required, since the water pump 94 stops operation. The higher cooling performance of the radiator 92 to cool down the cooling water is required at the higher cooling water temperature Twe. The higher vehicle speed V tends to increase the resistance of the air against the vehicle during driving, accompanied with introduction of the outside air through the aperture 102. Under the condition of the higher vehicle speed V, the priority is thus to be given to reduction of the resistance of the air against the vehicle over the cooling performance of the radiator 92.

Figure 7:
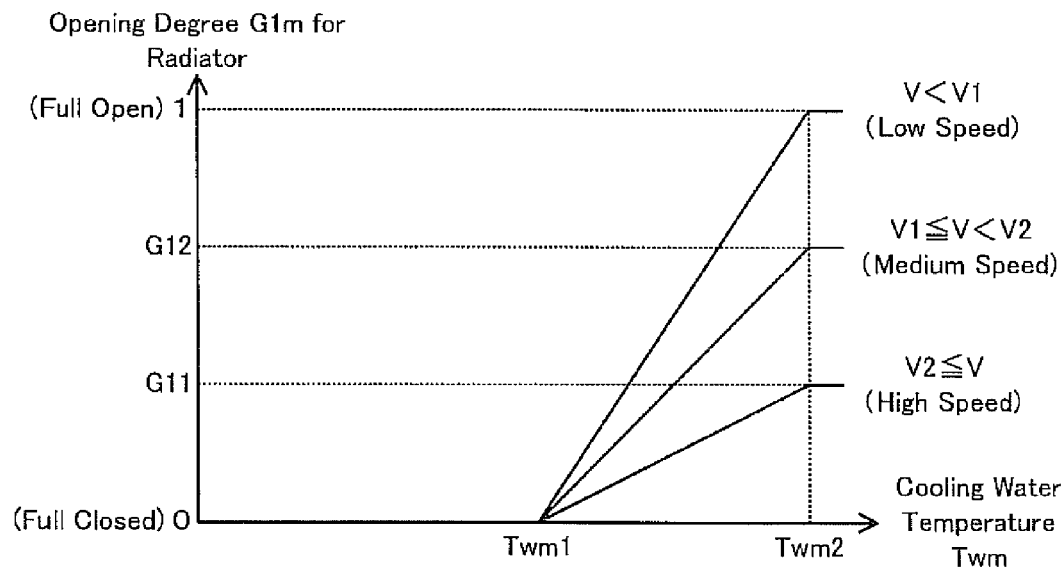
FIG. 7 is an explanatory view showing one example of a motor cooling system radiator opening degree setting map.

The CPU 72 subsequently sets an opening degree G1m for the radiator 96 required by the radiator 96 of the motor cooling system 90b as an opening degree of the aperture 102 formed in the vehicle front face, based on the input cooling water temperature Twm in the motor cooling system 90b and the input vehicle speed V (step S120). The CPU 72 then selects the greater between the set opening degree G1e for the radiator 92 and the set opening degree G1m for the radiator 96 and sets the selected opening degree to a target opening degree G1* of the aperture 102 for the radiators 92 and 96 (step S130). A concrete procedure of setting the opening degree G1m for the radiator 96 in the embodiment specifies and stores relations of the opening degree G1m to the cooling water temperature Twm with regard to various settings of the vehicle speed V as a motor cooling system radiator opening degree setting map in the ROM 74. The procedure reads and sets the opening degree G1m corresponding to a given combination of the cooling water temperature Twm and the vehicle speed V from the stored motor cooling system radiator opening degree setting map. One example of the motor cooling system radiator opening degree setting map is shown in FIG. 7. As shown in FIG. 7, the motor cooling system radiator opening degree setting map is designed, such that the opening degree G1m is equal to 0 (representing a full closed position) at the cooling water temperature Twm of not higher than a preset first water temperature Twm1, independently of the vehicle speed V, and gradually increases from 0 with an increase of the cooling water temperature Twm from the first water temperature Twm1. The first water temperature Twm1 is set to be slightly higher than a lower limit value of an adequate temperature range suitable for actuation of the inverters 41 and 42 and the motors MG1 and MG2 and may be, for example, 50° C. or 60° C. In the high-speed driving state, the opening degree G1m reaches the first intermediate opening degree G11, when the cooling water temperature Twm becomes equal to or higher than a preset second water temperature Twm2. The second water temperature Twm2 is set to be slightly lower than an upper limit value of the adequate temperature range and may be, for example, 90° C. or 100° C. In the medium-speed driving state, the opening degree G1m reaches the second intermediate opening degree G12, when the cooling water temperature Twm becomes equal to or higher than the preset second water temperature Twm2. In the low-speed driving state, the opening degree G1m reaches 1 (representing a full open position), when the cooling water temperature Twm becomes equal to or higher than the preset second water temperature Twm2. Under the condition of the cooling water temperature Twm of not higher than the preset first water temperature Twm1, the cooling performance of the radiator 96 to cool down the cooling water is not required during actuation of the inverters 41 and 42 and the motors MG1 and MG2. The higher cooling performance of the radiator 96 to cool down the cooling water is required at the higher cooling water temperature Twm. The higher vehicle speed V tends to increase the resistance of the air against the vehicle during driving, accompanied with introduction of the outside air through the aperture 102. Under the condition of the higher vehicle speed V, the priority is thus to be given to reduction of the resistance of the air against the vehicle over the cooling performance of the radiator 96. Setting the greater between the opening degree G1e and the opening degree G1m to the target opening degree G1* gives preference to the greater cooling performance between the cooling performance required for the radiator 92 and the cooling performance required for the radiator 96.

Figure 8:
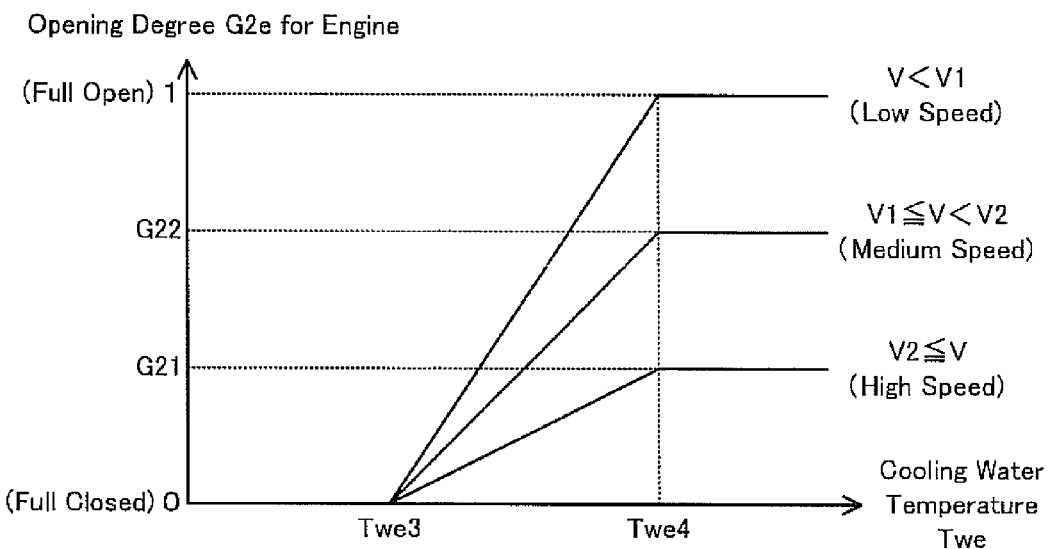
FIG. 8 is an explanatory view showing one example of an engine opening degree setting map.

After setting the target opening degree G1* of the aperture 102, the CPU 72 sets an opening degree G2e for the engine 22 required by the engine 22 as the opening degree of the aperture 112 formed in the vehicle front face, based on the input cooling water temperature Twe in the engine cooling water system 90a and the input vehicle speed V (step S140). A concrete procedure of setting the opening degree G2e for the engine 22 in the embodiment specifies and stores relations of the opening degree G2e to the cooling water temperature Twe with regard to various settings of the vehicle speed V as an engine opening degree setting map in the ROM 74. The procedure reads and sets the opening degree G2e corresponding to a given combination of the cooling water temperature Twe and the vehicle speed V from the stored engine opening degree setting map. One example of the engine opening degree setting map is shown in FIG. 8. As shown in FIG. 8, the engine opening degree setting map is designed, such that the opening degree G2e is equal to 0 (representing a full closed position) at the cooling water temperature Twe of not higher than a preset third water temperature Twe3 (for example, 35° C. or 45° C.) below the preset first water temperature Twe1 explained previously, independently of the vehicle speed V, and gradually increases from 0 with an increase of the cooling water temperature Twe from the third water temperature Twe3. In the high-speed driving state, the opening degree G2e reaches a first intermediate opening degree G21 (for example, 0.3 or 0.4) greater than 0, when the cooling water temperature Twe becomes equal to or higher than a preset fourth water temperature Twe4 (for example, 55° C. or 65° C.) below the preset second water temperature Twe2 explained previously. In the medium-speed driving state, the opening degree G2e reaches a second intermediate opening degree G22 (for example, 0.6 or 0.7) greater than the first intermediate opening degree G21, when the cooling water temperature Twe becomes equal to or higher than the preset fourth water temperature Twe4. In the low-speed driving state, the opening degree G2e reaches 1 (representing a full open position), when the cooling water temperature Twe becomes equal to or higher than the preset fourth water temperature Twe4. Even in the state where the cooling water temperature Twe is not higher than the preset first water temperature Twe1 and the cooling performance of the radiator 92 to cool down the cooling water is not required, the circumferential temperature of the engine 22 in operation may be increased by heat radiation from the engine 22 including the exhaust pipe 22d. It is thought that the temperature of the engine 22 is reflected on the cooling water temperature Twe. The higher cooling water temperature Twe is thus expected to reflect the higher amount of heat radiation from the engine 22. The higher vehicle speed V tends to increase the resistance of the air against the vehicle during driving, accompanied with introduction of the outside air through the aperture 112. Under the condition of the higher vehicle speed V, the priority is thus to be given to reduction of the resistance of the air against the vehicle over the cooling performance to cool down the engine 22.

Figure 9:
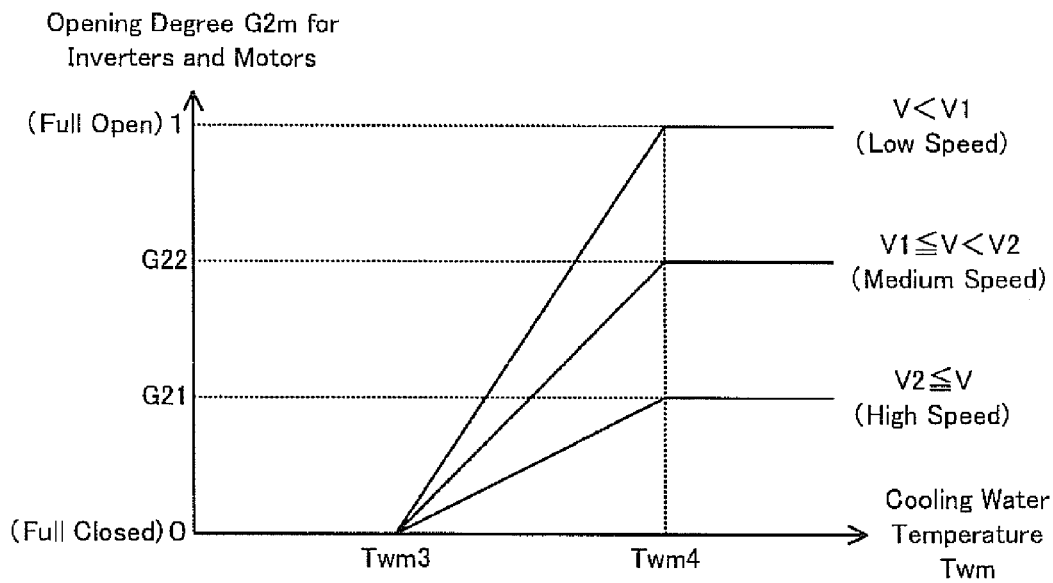
FIG. 9 is an explanatory view showing one example of an inverter motor opening degree setting map.

The CPU 72 subsequently sets an opening degree G2m required by the inverters 41 and 42 and the motors MG1 and MG2 (hereafter referred to as the opening degree G2m for the inverters and the motors) as an opening degree of the aperture 112 formed in the vehicle front face, based on the input cooling water temperature Twm in the motor cooling system 90b and the input vehicle speed V (step S150). The CPU 72 then selects the greater between the set opening degree G2e for the engine 22 and the set opening degree G2m for the inverters and the motors and sets the selected opening degree to a target opening degree G2* of the aperture 112 for the engine 22, the inverters 41 and 42, and the motors MG1 and MG2 (step S160). A concrete procedure of setting the opening degree G2m for the inverters and the motors in the embodiment specifies and stores relations of the opening degree G2m to the cooling water temperature Twm with regard to various settings of the vehicle speed V as an inverter motor opening degree setting map in the ROM 74. The procedure reads and sets the opening degree G2m corresponding to a given combination of the cooling water temperature Twm and the vehicle speed V from the stored inverter motor opening degree setting map. One example of the inverter motor opening degree setting map is shown in FIG. 9. As shown in FIG. 9, the inverter motor opening degree setting map is designed, such that the opening degree G2m is equal to 0 (representing a full closed position) at the cooling water temperature Twm of not higher than a preset third water temperature Twm3 (for example, 35° C. or 45° C.) below the preset first water temperature Twm1 explained previously, independently of the vehicle speed V, and gradually increases from 0 with an increase of the cooling water temperature Twm from the third water temperature Twm3. In the high-speed driving state, the opening degree G2m reaches the first intermediate opening degree G21, when the cooling water temperature Twm becomes equal to or higher than a preset fourth water temperature Twm4 (for example, 75° C. or 85° C.) below the preset second water temperature Twm2 explained previously. In the medium-speed driving state, the opening degree G2m reaches the second intermediate opening degree G22, when the cooling water temperature Twm becomes equal to or higher than the preset fourth water temperature Twm4. In the low-speed driving state, the opening degree G1m reaches 1 (representing a full open position), when the cooling water temperature Twm becomes equal to or higher than the preset fourth water temperature Twm4. Even in the state where the cooling water temperature Twm is not higher than the preset first water temperature Twm1 and the cooling performance of the radiator 96 to cool down the cooling water is not required, the circumferential temperatures of the inverters 41 and 42 and the motors MG1 and MG2 may be increased by actuation of the motors MG1 and MG2. It is thought that the temperatures of the inverters 41 and 42 and the motors MG1 and MG2 are reflected on the cooling water temperature Twm. The higher cooling water temperature Twm is thus expected to reflect the higher amounts of heat radiation from the inverters 41 and 42 and the motors MG1 and MG2. The higher vehicle speed V tends to increase the resistance of the air against the vehicle during driving accompanied with introduction of the outside air through the aperture 112. Under the condition of the higher vehicle speed V, the priority is thus to be given to reduction of the resistance of the air against the vehicle over the cooling performance to cool down the inverters 41 and 42 and the motors MG1 and MG2. Setting the greater between the opening degree G2e and the opening degree G2m to the target opening degree G2* gives preference to the greater cooling requirement between the cooling requirement to cool down the engine 22 and the cooling requirement to cool down the inverters 41 and 42 and the motors MG1 and MG2.

After setting the target opening degree G1* of the aperture 102 and the target opening degree G2* of the aperture 112, the CPU 72 drives the motor 105 to actuate the shutter plates 106 and adjust the opening degree of the aperture 102 to the set target opening degree G1*, while driving the motor 115 to actuate the shutter plates 116 and adjust the opening degree of the aperture 112 to the set target opening degree G2* (step S170). The CPU 72 then exits from the outside air introduction amount control routine. As discussed above, the hybrid vehicle of the embodiment is equipped with the outside air introduction assembly 104 functioning to introduce the outside air into the radiators 92 and 96 during driving, as well as with the outside air introduction assembly 114 functioning to introduce the outside air into the engine 22, the inverters 41 and 42, and the motors MG1 and MG2. The hybrid vehicle 20 of the embodiment is also equipped with the shutter plates 106 capable of adjusting the opening area of the aperture 102 to regulate the amount of the outside air to be introduced by the outside air introduction assembly 104, as well as with the shutter plates 116 capable of adjusting the opening area of the aperture 112 to regulate the amount of the outside air to be introduced by the outside air introduction assembly 114. This structure enables the radiators 92 and 96 to cool down the cooling water and enables the engine 22, the inverters 41 and 42, and the motors MG1 and MG2 to be cooled down, while reducing the resistance of the air against the vehicle during driving. The shutter plates 106 and the shutter plates 116 are individually actuated and controlled to increase the amount of the outside air to be introduced by the outside air introduction assembly 104 and the amount of the outside air to be introduced by the outside air introduction assembly 114 with an increase of the cooling water temperature Twe or an increase of the cooling water temperature Twm and with a decrease of the vehicle speed V. Such actuation and control assures the effective reduction of the resistance of the air against the vehicle during driving and the adequate cooling performances to cool down the cooling water by the radiators 92 and 96 and to cool down the engine 22, the inverters 41 and 42, and the motors MG1 and MG2. This arrangement desirably prevents untimely deterioration of resin components, such as cables, clips, and casings, located in the periphery of the engine 22 or in the vicinity of the inverters 41 and 42 and the motors MG1 and MG2 due to a temperature rise of the engine 22 or temperature rises of the inverters 41 and 42 and the motors MG1 and MG2.

The hybrid vehicle 20 of the embodiment discussed above is equipped with the outside air introduction assembly 104 functioning to introduce the outside air into the radiator 92, as well as with the outside air introduction assembly 114 functioning to introduce the outside air into the engine 22. The hybrid vehicle 20 of the embodiment is also equipped with the shutter plates 106 capable of regulating the amount of the outside air to be introduced by the outside air introduction assembly 104, as well as with the shutter plates 116 capable of regulating the amount of the outside air to be introduced by the outside air introduction assembly 114. This structure enables the radiator 92 to cool down the cooling water and enables the engine 22 to be cooled down. The shutter plates 106 and the shutter plates 116 are individually actuated and controlled to increase the amount of the outside air to be introduced by the outside air introduction assembly 104 and the amount of the outside air to be introduced by the outside air introduction assembly 114 with an increase of the cooling water temperature Twe. Such actuation and control assures the adequate cooling performances to cool down the cooling water by the radiator 92 and to cool down the engine 22. When the cooling water temperature Twe is not higher than the preset first water temperature Twe1 and the supply of the cooling water to the radiator 92 is shut off, the shutter plates 106 are actuated and controlled to prohibit the introduction of the outside air into the radiator 92. Such control effectively prevents needless introduction of the outside air into the radiator 92. The opening areas of the apertures 102 and 112 for introducing the outside air are adjustable by actuation of the shutter plates 106 and 116. Such adjustment effectively reduces the resistance of the air against the vehicle during driving. The shutter plates 106 and the shutter plates 116 are actuated and controlled to decrease the opening area for introduction of the outside air in the outside air introduction assembly 104 and the opening area for introduction of the outside air in the outside air introduction assembly 114 with an increase of the vehicle speed V. Such control assures the effective reduction of the resistance of the air against the vehicle during driving. The exhaust pipe 22d is provided on the front side of the engine 22, so that the front side of the engine 22 tends to have the higher temperature than that on the rear side of the engine 22 during operation of the engine 22. Introduction of the outside air into the engine 22 by the outside air introduction assembly 114 effectively cools down the exhaust pipe 22d. The partition member 118 is attached to the upper end of the aperture 112 and to the lower end of the radiator 96 to separate the outside air introduced by the outside air introduction assembly 104 from the outside air introduced by the outside air introduction assembly 114 in the engine room 100 during driving. This structure assures the effective introduction of the outside air into the radiator 92, as well as the effective introduction of the outside air into the engine 22. The engine 22 and the radiators 92 and 96 are fastened to the vehicle body in such a manner that the lower end of the radiator 96 is positioned above the lower end of the engine 22. This arrangement assures the effective introduction of the outside air into the engine 22 by the outside air introduction assembly 114. The shutter plates 106 are capable of regulating the amount of the outside air to be introduced into the radiator 96, as well as the amount of the outside air to be introduced into the radiator 92. The shutter plates 116 are capable of regulating the amount of the outside air to be introduced into the inverters 41 and 42 and the motors MG1 and MG2, as well as the amount of the outside air to be introduced into the engine 22. This arrangement enables the radiators 92 and 96 to cool down the cooling water and enables the engine 22, the inverters 41 and 42, and the motors MG1 and MG2 to be cooled down, while reducing the resistance of the air against the vehicle during driving. The shutter plates 106 and the shutter plates 116 are individually actuated and controlled to increase the amount of the outside air to be introduced by the outside air introduction assembly 104 and the amount of the outside air to be introduced by the outside air introduction assembly 114 with an increase of the cooling water temperature Twe or an increase of the cooling water temperature Twm and with a decrease of the vehicle speed V. Such actuation and control assures the effective reduction of the resistance of the air against the vehicle during driving and the adequate cooling performances to cool down the cooling water by the radiators 92 and 96 and to cool down the engine 22, the inverters 41 and 42, and the motors MG1 and MG2.

The hybrid vehicle 20 of the embodiment sets the greater between the opening degree G1e for the radiator 92 in the engine cooling system 90a and the opening degree G1m for the radiator 96 in the motor cooling system 90b to the target opening degree G1* of the aperture 102. One modified procedure may neglect the opening degree G1m for the radiator 96 and unconditionally set the opening degree G1e for the radiator 92 to the target opening degree G1* of the aperture 102.

The hybrid vehicle 20 of the embodiment sets the greater between the opening degree G2e for the engine 22 and the opening degree G2m for the inverters and the motors to the target opening degree G2* of the aperture 112. One modified procedure may neglect the opening degree G2m for the inverters and the motors and unconditionally set the opening degree G2e for the engine 22 to the target opening degree G2* of the aperture 112.

The hybrid vehicle 20 of the embodiment sets the opening degree G1e for the radiator 92 and the opening degree G2e for the engine 22 or the opening degree G1m for the radiator 96 and the opening degree G2m for the inverters and the motors to increase with an increase of the cooling water temperature Twe or an increase of the cooling water temperature Twm and with a decrease of the vehicle speed V. One modified procedure may set the opening degrees G1e and G2e or the opening degrees G1m and G2m to increase with an increase of the cooling water temperature Twe or an increase of the cooling water temperature Twm, independently of the vehicle speed V.

The hybrid vehicle 20 of the embodiment sets the opening degree G1e for the radiator 92 and the opening degree G2e for the engine 22 or the opening degree G1m for the radiator 96 and the opening degree G2m for the inverters and the motors to continuously increase with an increase of the cooling water temperature Twe or an increase of the cooling water temperature Twm. One modified procedure may set the opening degrees G1e and G2e or the opening degrees G1m and G2m to increase in a stepwise manner with an increase of the cooling water temperature Twe or an increase of the cooling water temperature Twm.

The hybrid vehicle 20 of the embodiment sets the opening degree G1e for the radiator 92 and the opening degree G2e for the engine 22 or the opening degree G1m for the radiator 96 and the opening degree G2m for the inverters and the motors according to the vehicle speed V to increase in a stepwise manner in the order of the high-speed driving state, the medium-speed driving state, and the low-speed driving state. One modified procedure may set the opening degrees G1e, G2e, G1m, and G2m to increase continuously with a decrease of the vehicle speed V.

The hybrid vehicle 20 of the embodiment sets 0 (representing the full closed position) to the opening degree G1e for the radiator 92, when the cooling water temperature Twe is not higher than the preset first water temperature Twe1 and the stop of the water pump 94 shuts off the supply of the cooling water to the radiator 92. In one modification, the opening degree G1e may be set equal to 0 in a certain range of the cooling water temperature Twe around the first water temperature Twe1, which includes slightly higher water temperatures and slightly lower water temperatures than the first water temperature Twe1, irrespective of the operation or the stop of the water pump 94.

The hybrid vehicle 20 of the embodiment stops operation of the water pump 94 in the engine cooling system 90a at the cooling water temperature Twe of not higher than the preset first water temperature Twe1, while always keeping on the water pump 98 in the motor cooling system 90b. In one modification, the water pump 94 may be controlled to be always kept on, irrespective of the cooling water temperature Twe. In another modification, the water pump 98 may be controlled to stop operation at the cooling water temperature Twe of not higher than the first water temperature Twe1.

In the hybrid vehicle 20 of the embodiment, the shutter plates 106 and 116 are provided on the rear side of the apertures 102 and 112 formed in the vehicle front face to adjust the opening areas of the apertures 102 and 112. The shutter plates 106 and 116 are actuated to regulate the amounts of the outside air to be introduced by the outside air introduction assemblies 104 and 114. One modified structure may exclude the shutter plates 106 and 116 and arrange the baffle plates 103 and 113 provided in the apertures 102 and 112 to be capable of adjusting their angles relative to the vehicle forwarding direction. In this modified structure, the baffle plates 103 and 113 are actuated to regulate the amounts of the outside air to be introduced by the outside air introduction assemblies 104 and 114. Another modified structure may use shutter plates capable of adjusting the opening area for introduction of the outside air or baffle plates capable of adjusting the direction of introduction of the outside air to regulate the amount of the outside air to be introduced into each relevant component. Such shutter plates or baffle plates may be provided in a specific space in the outside air introduction assembly 104 on the front side of the radiator 92 and on the rear side of the aperture 102 or in a specific space in the outside air introduction assembly 114 on the rear side of the aperture 112 and on the front side of the lower portion of the engine 22 or on the front side of the casing 40b with the motors MG1 and MG2 kept therein. In this modified structure, the shutter plates or the baffle plates are actuated to regulate the amounts of the outside air to be introduced by the outside air introduction assemblies 104 and 114.

In the hybrid vehicle 20 of the embodiment, the air intake pipe 22b is located on the rear side of the engine 22, and the exhaust pipe 22d is located on the front side of the engine 22. In one modified structure, an air intake pipe may be located on the front side of the engine 22, and an exhaust pipe may be located on the rear side of the engine 22.

In the hybrid vehicle 20 of the embodiment, the partition member 118 is attached to the upper end of the aperture 112 and to the lower end of the radiator 96 to separate the outside air introduced by the outside air introduction assembly 104 from the outside air introduced by the outside air introduction assembly 114. One modified structure may exclude the partition member 118.

Figure 10:
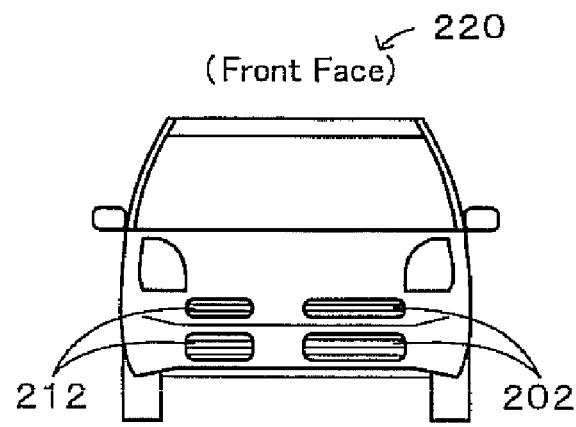
FIG. 10 is an explanatory view illustrating the schematic configuration of a motor vehicle in one modified example of the invention.
Figure 10:
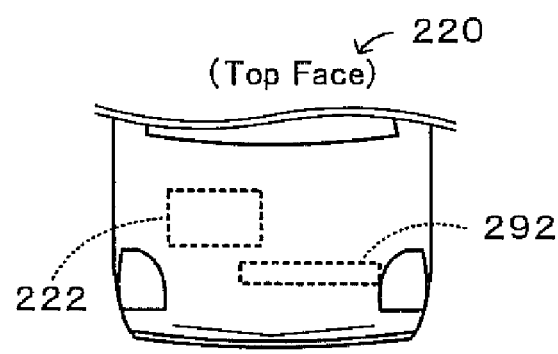

In the hybrid vehicle 20 of the embodiment, the aperture 112 is formed below the aperture 102 on the vehicle front face. The engine 22 and the radiators 92 and 96 are fastened to the vehicle body, such that the lower end of the radiator 96 is located above the lower end of the engine 22. The outside air taken in via the aperture 112 passes through the lower side of the radiators 92 and 96 and is introduced into the engine 22. As a motor vehicle 220 of one modified example shown in FIG. 10, a first aperture 202 and a second aperture 212 may be provided on the left side and on the right side of the vehicle front face. An engine 222 and a radiator 292 for the engine 222 may be fastened to the vehicle body, such that a right end of the radiator 292 is located on the left side of a right end of the engine 222. In this modified example, the outside air taken in via the second aperture 212 passes through the right side of the radiator 292 and is introduced into the engine 222. Any other structure may be provided to have an outside air introduction assembly functioning to introduce the outside air from a forefront of an engine room into a radiator for an engine during driving and an outside air introduction assembly functioning to introduce the outside air from the forefront of the engine room into the engine during driving.

Figure 11:
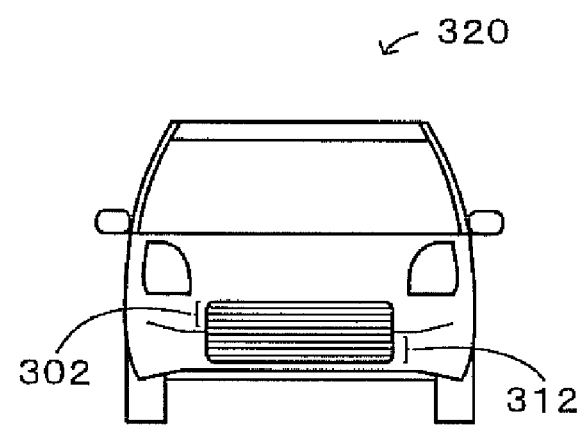
FIG. 11 is an explanatory view illustrating the schematic configuration of another motor vehicle in another modified example of the invention.

The hybrid vehicle 20 of the embodiment has the two apertures 102 and 112 formed in the vehicle front face to be aligned in a vertical direction. As the motor vehicle 220 shown in FIG. 10, the apertures 202 and 212 may be formed to be aligned in a horizontal direction. Each of the apertures 202 and 212 may be formed to have multiple openings. As another motor vehicle 320 of another modified example shown in FIG. 11, a first aperture 302 and a second aperture 312 may form respective parts of one single large hole.

The hybrid vehicle 20 of the embodiment sets the opening degree G2e of the aperture 112 for the engine 22, based on the cooling water temperature Twe of the engine cooling system 90a, which is expected to reflect the temperature of the engine 22. One modified procedure may set the opening degree G2e, based on a lubricant temperature of lubricating oil in the engine 22 detected by and input from an oil temperature sensor (not shown), which is expected to reflect the temperature of the engine 22.

The hybrid vehicle 20 of the embodiment sets the opening degree G2m of the aperture 112 for the inverter and the motors, based on the cooling water temperature Twm of the motor cooling system 90b, which is expected to reflect the temperatures of the inverters 41 and 42 and the motors MG1 and MG2. One modified procedure may set the opening degree G2m, based on a lubricant temperature of lubricating oil in the inverters 41 and 42 and the motors MG1 and MG2 detected by and input from an oil temperature sensor (not shown), which is expected to reflect the temperatures of the inverters 41 and 42 and the motors MG1 and MG2. Another modified procedure may set the opening degree G2m, based on a temperature of switching elements in the inverters 41 and 42 detected by and input from a temperature sensor (not shown).

The above embodiment describes the application of the invention to the hybrid vehicle 20 equipped with the engine 22 and the motor MG1 connected to the driveshaft 32 via the planetary gear mechanism 30 and with the motor MG2 connected to the driveshaft 32. The present invention may also be applied to another hybrid vehicle equipped with an engine and a motor connected to a driveshaft with omission of the motor MG1 and still another hybrid vehicle equipped with a generator consuming all the power from an engine to generate electric power and charge a battery and with a motor using the electric power from the battery to generate a driving power of the hybrid vehicle, as well as to a conventional motor vehicle equipped with a transmission making the power from an engine subjected to speed change and output to a driveshaft. In the application of the invention to the conventional motor vehicle, the control procedure may not have the opening degree G1m for the radiator 96 or the opening degree G2m for the inverters and the motors but set the opening degree G1e for the radiator 92 to the target opening degree G1* of the aperture 102 and the opening degree G2e for the engine 22 to the target opening degree G2* of the aperture 112.

The present invention is not restricted to the motor vehicles including the hybrid vehicles discussed above but includes other applications, such as a control method of the motor vehicle.

The primary elements in the embodiment and its modified examples are mapped to the primary constituents in the claims of the invention as described below. The engine room 100, the engine 22, the radiator 92, the outside air introduction assembly 104, and the outside air introduction assembly 114 in the structure of the embodiment respectively correspond to the 'storage space', the 'internal combustion engine', the 'heat exchanger', the 'first outside air introduction assembly', and the 'second outside air introduction assembly' in the claims of the invention. The combination of the shutter plates 106 and the motor 105 of the embodiment is equivalent to the 'first adjustment assembly' in the claims of the invention. The combination of the shutter plates 116 and the motor 115 of the embodiment is equivalent to the 'second adjustment assembly' in the claims of the invention. The water temperature sensor corresponds to the 'engine cooling liquid temperature detection unit', as well as the 'engine reflecting temperature detection unit' in the claims of the invention. The electronic control unit 70 performing the outside air introduction amount control routine of FIG. 5 in the embodiment is equivalent to the 'controller' in the claims of the invention. The outside air introduction amount control routine of FIG. 5 actuates the motor 105 and controls the shutter plates 106 to increase the amount of the outside air to be introduced by the outside air introduction assembly 104 with an increase of the cooling water temperature Twe detected by the water temperature sensor 23, while actuating the motor 115 and controlling the shutter plates 116 to increase the amount of the outside air to be introduced by the outside air introduction assembly 114 with an increase of the cooling water temperature Twe detected by the water temperature sensor 23. The vehicle speed sensor 88, the partition member 118, the motor MG2, and the inverter 42 of the embodiment respectively correspond to the 'vehicle speed measurement unit', the 'partition member', the 'motor', and the 'driving circuit' in the claims of the invention. The combination of the motor MG2 and the inverter 42 of the embodiment is equivalent to the 'motor driving system' in the claims of the invention. The radiator 96 of the embodiment corresponds to the 'motor driving system heat exchanger' in the claims of the invention. The water temperature sensor 43 corresponds to the 'motor driving system cooling liquid temperature detection unit', as well as the 'motor driving system reflecting temperature detection unit' in the claims of the invention.

The 'storage space' herein is not restricted to the engine room 100 but may be any structure provided in the vehicle front portion to hold the internal combustion engine and the other relevant components therein. The 'internal combustion engine' herein is not restricted to the engine 22 consuming a hydrocarbon fuel, such as gasoline or light oil, to output the power, but may be any type of internal combustion engine, for example, a hydrogen engine. The 'heat exchanger' herein is not restricted to the radiator 92 but may be any structure provided in proximity to the forefront of the storage space and arranged to perform heat exchange between the cooling liquid used for cooling down the internal combustion engine and the outside air. The 'first outside air introduction assembly' herein is not restricted to the outside air introduction assembly 104 but may be any structure arranged to introduce the outside air from the forefront of the storage space into the heat exchanger during driving of the motor vehicle. The 'second outside air introduction assembly' herein is not restricted to the outside air introduction assembly 114 but may be any structure arranged to introduce the outside air from the forefront of the storage space into the internal combustion engine during driving of the motor vehicle. The 'first adjustment assembly' herein is not restricted to the combination of the shutter plates 106 and the motor 105 but may be any structure arranged to regulate the amount of the outside air to be introduced into the heat exchanger by the first outside air introduction assembly. The 'second adjustment assembly' herein is not restricted to the combination of the shutter plates 116 and the motor 115 but may be any structure arranged to regulate the amount of the outside air to be introduced into the internal combustion engine by the second outside air introduction assembly. The 'engine cooling liquid temperature detection unit' herein is not restricted to the water temperature sensor 23 but may be any instrument designed to detect the temperature of the cooling liquid in the internal combustion engine as the engine cooling liquid temperature. The 'engine reflecting temperature detection unit' herein is not restricted to the water temperature sensor 23 but may be any instrument designed to detect the specific temperature reflecting the temperature of the internal combustion engine as the engine reflecting temperature. The 'controller' herein is not restricted to one single electronic control unit but may be any combination of multiple electronic control units. The 'controller' herein is not restricted to the electronic control unit 70 performing the outside air introduction amount control routine of FIG. 5, which actuates the motor 105 and controls the shutter plates 106 to increase the amount of the outside air to be introduced by the outside air introduction assembly 104 with an increase of the cooling water temperature Twe detected by the water temperature sensor 23, while actuating the motor 115 and controlling the shutter plates 116 to increase the amount of the outside air to be introduced by the outside air introduction assembly 114 with an increase of the cooling water temperature Twe detected by the water temperature sensor 23. The 'controller' may be any configuration of controlling the first adjustment assembly to increase the amount of the outside air to be introduced into the heat exchanger with an increase of the detected engine cooling liquid temperature and controlling the second adjustment assembly to increase the amount of the outside air to be introduced into the internal combustion engine with an increase of the detected engine reflecting temperature. The 'vehicle speed measurement unit' herein is not restricted to the vehicle speed sensor 88 but may be any instrument designed to measure the vehicle speed. The 'partition member' herein is not restricted to the 'partition member' 118 but may be any structure arranged to separate the outside air taken in from the forefront of the storage space by the first outside air introduction assembly from the outside air taken in from the forefront of the storage space by the second outside air introduction assembly as the outside air to be introduced into the heat exchanger and as the outside air to be introduced into the internal combustion engine. The 'motor' herein is not restricted to the motor MG2 constructed as the synchronous generator motor but may be any type of motor designed to receive a supply of electric power from an accumulator and generate a driving power of the motor vehicle, for example, an induction motor. The 'driving circuit' herein is not restricted to the inverter 42 but maybe any structure arranged to drive the motor. The 'motor driving system' herein is not restricted to the combination of the motor MG2 and the inverter 42 but may be any system provided in proximity to the internal combustion engine in the storage space and constructed to include the motor and the driving circuit. The 'motor driving system heat exchanger' herein is not restricted to the radiator 96 but may be any structure provided in proximity to the heat exchanger in the storage space and arranged to perform heat exchange between the cooling liquid used for cooling down the motor driving system and the outside air. The 'motor driving system cooling liquid temperature detection unit' herein is not restricted to the water temperature sensor 43 but may be any instrument designed to detect the temperature of the cooling liquid in the motor driving system as the motor driving system cooling liquid temperature. The 'motor driving system reflecting temperature detection unit' herein is not restricted to the water temperature sensor 43 but may be any instrument designed to detect the specific temperature reflecting the temperature of the motor driving system as the motor driving system reflecting temperature.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The principle of the present invention is preferably applied to the manufacturing industries of motor vehicles.

The disclosure of Japanese Patent Application No. 2008-285577 filed on Nov. 6, 2008 including specification, drawings and claims is incorporated herein by reference in its entirety.

What is claimed is:

1. A motor vehicle equipped with an internal combustion engine held in a storage space provided in a vehicle front portion, the motor vehicle comprising:
   a heat exchanger provided in proximity to a forefront of the storage space and arranged to perform heat exchange between a cooling liquid used for cooling down the internal combustion engine and outside air;
   a first outside air introduction assembly arranged to introduce the outside air from the forefront of the storage space into the heat exchanger during driving of the motor vehicle;
   a second outside air introduction assembly arranged to introduce the outside air from the forefront of the storage space into the internal combustion engine during driving of the motor vehicle;
   a first adjustment assembly arranged to regulate an amount of the outside air to be introduced into the heat exchanger by the first outside air introduction assembly; and
   a second adjustment assembly arranged to regulate an amount of the outside air to be introduced into the internal combustion engine by the second outside air introduction assembly;
   an engine cooling liquid temperature detection unit designed to detect temperature of the cooling liquid in the internal combustion engine as an engine cooling liquid temperature; and
   a controller configured to control the first adjustment assembly to increase the amount of the outside air to be introduced into the heat exchanger with an increase of the detected engine cooling liquid temperature from a first temperature that is an upper limit of temperature range in which the cooling liquid is not supplied to the heat exchanger,
   the controller controlling the second adjustment assembly to increase the amount of the outside air to be introduced into the internal combustion engine with an increase of the detected engine cooling liquid temperature from a second temperature that is lower than the first temperature.

2. The motor vehicle in accordance with claim 1, wherein on a condition of no supply of the cooling liquid to the heat exchanger, the controller controls the first adjustment assembly to prohibit introduction of the outside air into the heat exchanger.

3. The motor vehicle in accordance with claim 1, wherein the first adjustment assembly adjusts an area for introduction of the outside air in the first outside air introduction assembly, so as to regulate the amount of the outside air to be introduced into the heat exchanger, and
   the second adjustment assembly adjusts an area for introduction of the outside air in the second outside air introduction assembly, so as to regulate the amount of the outside air to be introduced into the internal combustion engine.

4. The motor vehicle in accordance with claim 3, the motor vehicle further including:

a vehicle speed measurement unit designed to measure a vehicle speed; and a controller configured to control the first adjustment assembly and the second adjustment assembly to decrease the area for introduction of the outside air in the first outside air introduction assembly and the area for introduction of the outside air in the second outside air introduction assembly with an increase of the measured vehicle speed.

5. The motor vehicle in accordance with claim 1, wherein the internal combustion engine has an exhaust system provided on a front side of the internal combustion engine along a longitudinal axis of the motor vehicle.

6. The motor vehicle in accordance with claim 1, the motor vehicle further including:

a partition member arranged to separate the outside air taken in from the forefront of the storage space by the first outside air introduction assembly from the outside air taken in from the forefront of the storage space by the second outside air introduction assembly as the outside air to be introduced into the heat exchanger and as the outside air to be introduced into the internal combustion engine.

7. The motor vehicle in accordance with claim 1, wherein the heat exchanger is attached to the storage space in such a manner that a lower end of the heat exchanger is positioned above a lower end of the internal combustion engine along a vertical axis of the motor vehicle, and the second outside air introduction assembly takes in the outside air and causes the taken outside air to pass through a space below the heat exchanger and to be introduced into the internal combustion engine.

8. A motor vehicle equipped with an internal combustion engine held in a storage space provided in a vehicle front portion, the motor vehicle comprising:

a heat exchanger provided in proximity to a forefront of the storage space and arranged to perform heat exchange between a cooling liquid used for cooling down the internal combustion engine and outside air;

a motor driving system provided in proximity to the internal combustion engine in the storage space and constructed to include: a motor designed to receive a supply of electric power from an accumulator and generate a driving power of the motor vehicle; and a driving circuit arranged to drive the motor;

a motor driving system heat exchanger provided in proximity to the heat exchanger in the storage space and arranged to perform heat exchange between the cooling liquid used for cooling down the motor driving system and the outside air;

a first outside air introduction assembly arranged to introduce the outside air from the forefront of the storage space into the heat exchanger and into the motor driving system heat exchanger during driving of the motor vehicle;

a second outside air introduction assembly arranged to introduce the outside air from the forefront of the storage space into the internal combustion engine and into the motor driving system during driving of the motor vehicle:

a first adjustment assembly arranged to regulate an amount of the outside air to be introduced into the heat exchanger and into the motor driving system heat exchanger by the first outside air introduction assembly;

a second adjustment assembly arranged to regulate an amount of the outside air to be introduced into the internal combustion engine and into the motor driving system by the second outside air introduction assembly:

an engine cooling liquid temperature detection unit designed to detect temperature of the cooling liquid in the internal combustion engine as an engine cooling liquid temperature;

a motor driving system cooling liquid temperature detection unit designed to detect temperature of the cooling liquid in the motor driving system as a motor driving system cooling liquid temperature; and a controller configured to control the first adjustment assembly to set the greater between the amount of the outside air to be introduced into the heat exchanger and the amount of the outside air to be introduced into the motor driving system heat exchanger to a target amount of the outside air to be introduced by the first outside air introduction assembly, where the amount of the outside air to be introduced into the heat exchanger increases with an increase of the detected engine cooling liquid temperature from a first temperature that is an upper limit of temperature range in which the cooling liquid is not supplied to the heat exchanger, and the amount of the outside air to be introduced into the motor driving system heat exchanger increases with an increase of the detected motor driving system cooling liquid temperature, the controller controlling the second adjustment assembly to set the greater between the amount of the outside air to be introduced into the internal combustion engine and the amount of the outside air to be introduced into the motor driving system to a target amount of the outside air to be introduced by the second outside air introduction assembly, where the amount of the outside air to be introduced into the internal combustion engine increases with an increase of the detected engine cooling liquid temperature from a second temperature that is lower than the first temperature, and the amount of the outside air to be introduced into the motor driving system increases with an increase of the detected engine cooling liquid temperature.

9. A control method of a motor vehicle, the motor vehicle including: an internal combustion engine held in a storage space provided in a vehicle front portion; a heat exchanger provided in proximity to a forefront of the storage space and arranged to perform heat exchange between a cooling liquid used for cooling down the internal combustion engine and outside air; a first outside air introduction assembly arranged to introduce the outside air from the forefront of the storage space into the heat exchanger during driving of the motor vehicle; a second outside air introduction assembly arranged to introduce the outside air from the forefront of the storage space into the internal combustion engine during driving of the motor vehicle; a first adjustment assembly arranged to regulate an amount of the outside air to be introduced into the heat exchanger by the first outside air introduction assembly; and a second adjustment assembly arranged to regulate an amount of the outside air to be introduced into the internal combustion engine by the second outside air introduction assembly, the control method controlling the first adjustment assembly to increase the amount of the outside air to be introduced into the heat exchanger with an increase of temperature of the cooling liquid in the internal combustion engine detected as an engine cooling liquid temperature from a first temperature that is an upper limit of temperature range in which the cooling liquid is not supplied to the heat exchanger, the control method controlling the second adjustment assembly to increase the amount of the outside air to be introduced into the internal combustion engine with an increase of the engine cooling liquid temperature from a second temperature that is lower than the first temperature.

* * * * *